O. M. LEICH.
CURRENT MODIFIER.
APPLICATION FILED MAY 18, 1916.
1,271,733.
Patented July 9, 1918.
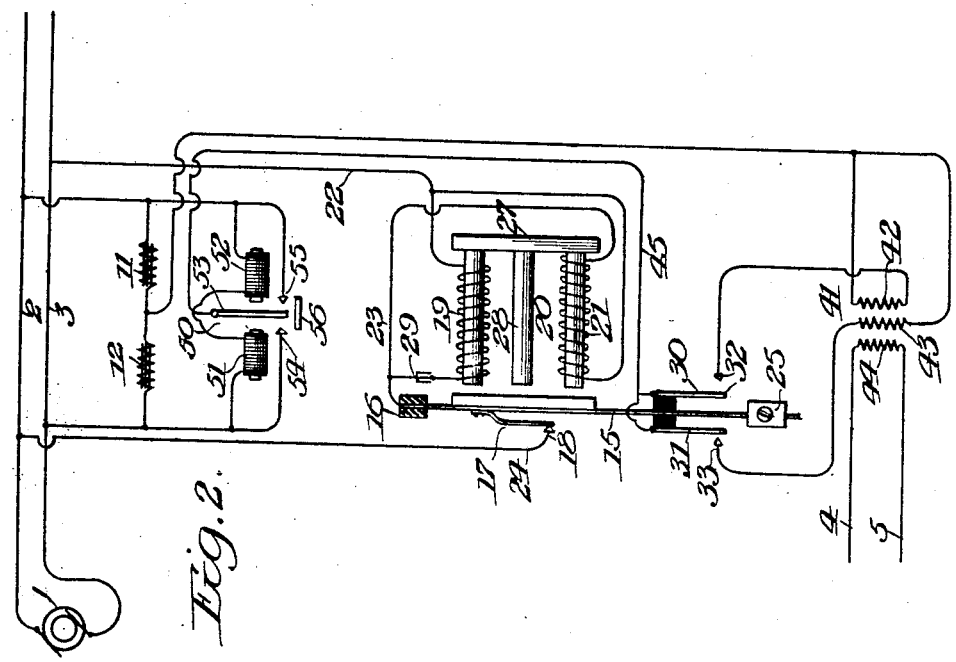
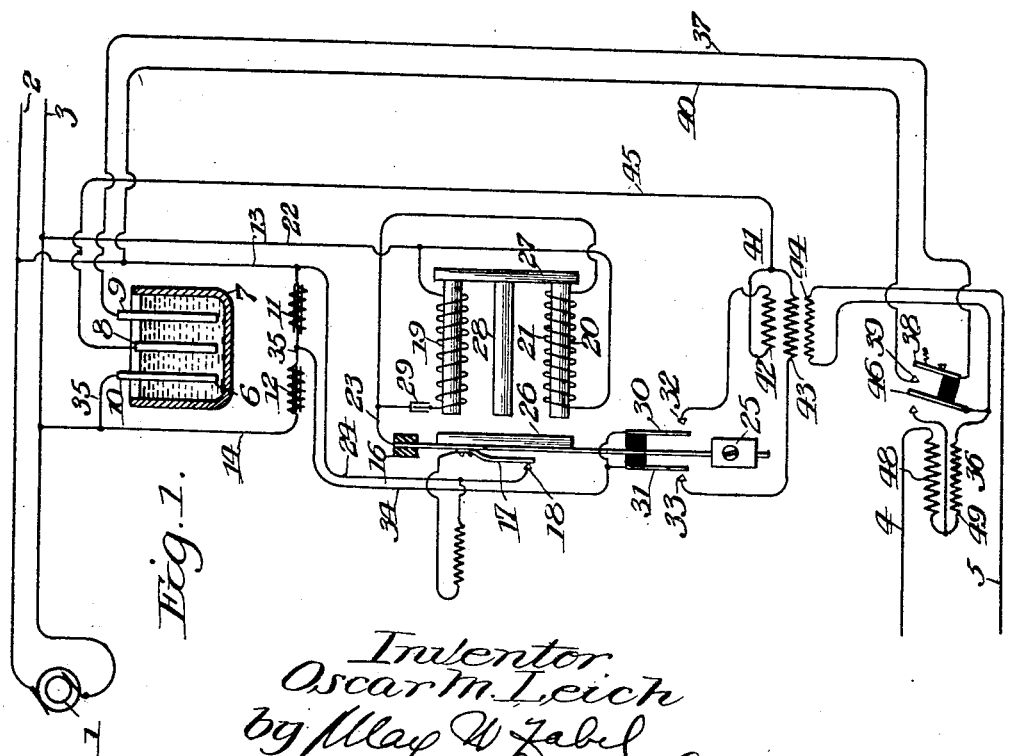
Inventor
Oscar M. Leich
by May W. Zabel
Atty.

UNITED STATES PATENT OFFICE.

OSCAR M. LEICH, OF GENOA, ILLINOIS, ASSIGNOR TO LEICH ELECTRIC COMPANY, OF GENOA, ILLINOIS.

CURRENT-MODIFIER.

1,271,733. Specification of Letters Patent. Patented July 9, 1918.

Original application filed March 24, 1915, Serial No. 16,564. Divided and this application filed May 18, 1916. Serial No. 98,266.

*To all whom it may concern:*

Be it known that I, OSCAR M. LEICH, a citizen of the United States, residing at Genoa, in the county of Dekalb and State of Illinois, have invented a certain new and useful Improvement in Current-Modifiers, of which the following is a full, clear, concise, and exact description, reference being had to the accompanying drawings, forming a part of this specification.

My invention relates to current modifiers, and in one form of its application is of particular use in providing a vibrator for instance which can be operated directly from an alternating current circuit and provide intermittent or pulsatory current of a frequency other than that of the source. More specifically, my invention finds great application in connection with vibrators used for signaling purposes in telephone exchanges or similar places, and my invention will be readily understood if in the description which I will now give I will explain it more particularly as applied to such a telephone vibrator.

My application herein is a divisional application of my prior application Serial No. 16,564, filed March 24, 1915.

When my invention is thus applied, I may say that in one specific case I operate the device from a sixty cycle alternating current which operates a vibrating element. Current from the source may then be led through a suitable rectifier if it is desired to rectify the current, and this rectified current will then be reimpressed on the ringing circuit through the interposition of switching or similar elements controlled by the vibrating element aforesaid.

I will explain my invention more in detail as applied to two specific styles of rectifiers by referring to the accompanying drawings, in which—

Figure 1 diagrammatically sets forth my invention in connection with an electrolytic rectifier, and Fig. 2 is a similar view with an electromagnetic rectifier.

Referring to Fig. 1, I have a source of alternating current 1 which preferably is of the sixty cycle, one hundred and ten volt type as supplying current to the conductors 2 and 3. I show a ringing circuit having the conductors 4 and 5 which when my invention is used for telephone purposes lead directly to the switch board, where through the interposition of ringing keys these conductors 4 and 5 are connected with the telephone line to call the substation signal as is customary. I might say here that my improved device can supply the current at any desired frequency so that it may not only be used for operating the ordinary polarized bells of telephone receivers, but may also operate harmonic ringers or similar devices as may be required.

One great advantage in the use of my vibrator as will appear presently resides in the fact that the vibrator requires a practically negligible no-load current so that the expense of operation is reduced to a minimum. I show a rectifier 6 which may be of any desired type of rectifier, but which herein is of the electrolytic type having the jar 7, the lead electrode 8 and the two platinum electrodes 9 and 10. It is well known of course that with the platinum electrode in the electrolytic cell current of one direction only passes therethrough. The rectifier is used in connection with two impedance coils 11 and 12 which are directly or inductively connected across the conductors 2 and 3, the circuit being traceable from the conductor 2 by way of the conductor 13, impedance coil 11, impedance coil 12, conductor 14, to the line conductor 3.

I have provided a vibrating element 15 consisting of a spring which may be tuned to a certain frequency if desired so that if actuated electro-magnetically it will vibrate with said frequency. A permanent mounting 16 is provided for this spring. This spring carries a contact element 17 which in conjunction with the stationary back contact 18 controls the circuit through coils 19 and 20 forming the energizing coils of an electromagnet 21. The circuit through the coils 19 and 20 may then be traced from the line conductor 3 by way of conductor 22, coils 19 and 20 in parallel, by way of conductor 23 to the spring 15, the spring contact 17, the back contact 18, and by way of conductors 24 and 13 to the line conductor 2. It will thus be seen that the current from the source is used directly to actuate the vibrating element 15. This vibrating element 15 carries a weight 25 if desired further to adjust its frequency of vibration.

The coils 19 and 20 are each preferably of high resistance, for instance, one thousand ohms each so that very little no-load current is required to actuate the spring 15. The spring 15 carries an iron armature 26 which coöperates with the cores of the coils 19 and 20. The electromagnet 21 in addition to the keeper 27 is provided with a third leg 28 so that the armature 26 is more or less uninfluenced by the alternations of the current from the alternating current source, the rate of vibration depending upon the spring 15 and the energization of the coils 19 and 20 being controlled by the coöperation between the elements 17 and 18 as in the ordinary vibrating bell. One of the coils, the coil 19, for instance, has a condenser 29 included serially therewith so as to throw the currents in the coils 19 and 20 out of phase so that there is never a dead point in the energization, and the third leg 28 assists further in coöperating toward this end. The armature 26 thus is actuated by the coils 19 and 20 as the circuit through said coils is controlled by the elements 17 and 18 irrespective of the alternating character of the current threading said coils. The vibrator 15 carries circuit controlling springs 30 and 31 which coöperate with back contacts 32 and 33. The springs 30 and 31 are insulated from the vibrator 15, are electrically connected together however, and connected by means of the conductor 34 with the intermediate junction point 35 of the impedance coils 11 and 12. The impedance coils 11 and 12 of course are of sufficient impedance that their no-load requirements are very small. The platinum electrode 10 is directly connected by means of the conductor 35 with the conductor 14 leading to the line conductor 3. The platinum electrode 9 is intermittently connected with the other line conductor 2 in accordance with the operations of a relay 36, this circuit being traceable from said electrode 9 by way of conductor 37, contact spring 38, front contact 39, conductor 40, to the conductor 13 which leads directly to the line conductor 2.

Thus whenever the relay 36 is energized the electrolytic cell is directly in bridge of the mains 2 and 3. I provide a transformer 41 consisting of the primary windings 42 and 43 and the secondary winding 44. The coils 42 and 43 are connected in parallel except that they are differentially connected as shown with a free terminal of each leading respectively to the front contacts 32 and 33. The remaining terminals of these primary coils 42 and 43 are connected together and then connected by means of the conductor 45 to the lead electrode 8. The secondary winding 44 has one terminal directly connected to the ringing lead 5 and its other terminal is connected to the armature 46 of the relay 36. The armature 46 coöperates with a front contact 47. This relay 36 has two coils respectively 48 and 49, the coil 48 being low wound, say fifty ohms, and the coil 49 being high wound, say one thousand ohms.

Now it will thus be seen that initially the circuit through the secondary winding 44 can be traced from the ringing lead 4 through the coil 48, the coil 49, secondary 44, to the conductor 5. If a ringing circuit is established across the leads 4 and 5, then the relay 36 attracts its armature 46, thereby short circuiting the coil 49 so that the secondary winding 44 furnishes its current directly to the leads 4 and 5 through the interposition merely of the fifty ohm coil 48 whose magnetism however is sufficient to hold the armature 46 so long as the circuit across the leads 4 and 5 remains closed. I may say that the transformer 41 serves to change the voltage as may be required and I find in one form of the device that I have satisfactory service if the coils 42 and 43 each have eight hundred turns, whereas the winding 44 has twelve hundred turns.

I may say also that the solution which I use in the electrolytic cell may preferably be ammonium phosphate. I may say also that in the continuous operation of the electrolytic cell 6 sediment forms which collects at the bottom and which must be periodically removed. In order to reduce the amount of sediment thus thrown down, the circuit through the electrolytic cell is normally maintained open by the elements 38 and 39 of the relay 6. The no-load current to operate this device would be that consumed by the electromagnet 21 and that flowing through the coils 11 and 12. This no-load current is less than four-hundredths of an ampere. Of course, when the device is operating and has the electrolytic cell in bridge of the mains 2 and 3 then there is a slight additional leakage which however is similarly small.

Now in the operation of the device, let it be assumed that the vibrator is operating as explained. It is to be remembered that the coils 42 and 43 are connected to the lead electrode 8 and respectively to the contacts 32 and 33. Thus as the vibrator moves to and fro one coil 42 and then the other coil 43 is connected between the lead electrode 8 and the junction point 35 between the impedances 11 and 12. There is thus a pulsatory rectified current passing through the coils 42 and 43. The coils 42 and 43 however are differently wound and thus their effects are of opposite sign on the winding 44 even though these coils receive their current at times from the platinum electrode 9 and at other times from the platinum electrode 10.

It must be remembered of course that the vibrator 15 vibrates in accordance with its predetermined frequency or rate of vibration entirely unaffected as to whether the break at the elements 17 and 18 occurs at the peak of the wave or at any other time, this vibrator not necessarily operating in synchronism with the cycles of current furnished by the source 1.

Assume however that the elements 31 and 33 are in contact throughout the course of two or three cycles of alternating current, at that time the coil 43 is in circuit and receives several impulses all in the same direction however, alternately from the platinum electrode 9 and the platinum electrode 10. There is thus a unidirectional pulsating current traversing the coil 43 of a given sign. The next instant when the elements 30 and 32 are in contact there is a similar uni-directional pulsating current in the coil 42, but on account of its reverse connection the magnetic effect is opposite to that of the coil 43 so that a current of opposite sign flows through the winding 44. Thus for instance if it were desired to transform the sixty cycle current of the source into a twenty cycle ringing current, then the vibrator 15 would be tuned to cause a transference of current from one coil 42 to the other coil 43 and vice versa, once during each three cycles so that coil 42 for instance would receive three pulsations of similar sign, and then coil 43 would receive three pulsations of similar sign whose magnetic effects however would be of opposite sign.

Referring now to Fig. 2, I have shown my invention as used in connection with an electromagnet rectifier 50 having the operating coils 51 and 52 which control a polarized armature 53. The armature 53 cooperates with contact elements 54 and 55 to send a rectified current by way of the conductor 45 through the primary coils 42 and 43 respectively. A polarized magnet 56 is indicated. Similarly to the arrangement of Fig. 1 the rectified current in the winding 42 produces the opposite kind of a field to that produced in the coil 43 by reason of the reverse connection of these coils as is clear. The armature 53 of course vibrates with the frequency of the alternating current and thus the impulses of alternating current are rectified so as to establish a rectified current by way of the conductor 45. The operation is similar to that shown in Fig. 1.

From what has been described it is thought the nature of my invention will be readily clear to those skilled in the art and it will also be clear that many modifications may be made within the scope of the appended claims without departing from the spirit of my invention. Having however thus described one form which my invention may take, what I claim as new and desire to secure by Letters Patent is:

1. In a selective frequency signaling system the combination of an alternate current source of supply, a signaling circuit, a vibratory rectifier for changing the alternating current to a pulsatory uni-directional current, and a vibratory electromagnetically operated means connected to feed said rectified current to said signaling circuit at a fundamental rate of pulsation different from the rate of pulsation of said rectified current.

2. In a selective frequency signaling system the combination of an alternate current source of supply, a signaling circuit, a vibratory rectifier for changing the alternating current to a pulsatory uni-directional current, and a vibratory electromagnetically operated means excited from the alternating current source of supply connected to feed said rectified current to said signaling circuit at a fundamental rate of pulsation different from the rate of pulsation of said rectified current.

3. In a selective frequency signaling system the combination of an alternate current source of supply, a signaling circuit, a vibratory rectifier for changing the alternating current to a pulsatory uni-directional current, a vibratory electro-magnetically operated means connected to feed said rectified current to said signaling circuit at a fundamental rate of pulsation different from the rate of pulsation of said rectified current, and a transformer interposed between said vibratory means and said signaling circuit.

4. In a selective frequency signaling system the combination of an alternate current source of supply, a signaling circuit, a vibratory rectifier for changing the alternating current to a pulsatory uni-directional current, a vibratory electromagnetically operated means excited from the alternating current source of supply connected to feed said rectified current to said signaling circuit at a fundamental rate of pulsation different from the rate of pulsation of said rectified current, and a transformer interposed between said vibratory means and said signaling circuit.

In witness whereof, I hereunto subscribe my name this 25th day of April, A. D. 1916.

OSCAR M. LEICH.

Witnesses:
HAZEL A. JONES,
MAX W. ZABEL.